(12) United States Patent
Sun

(10) Patent No.: US 8,996,894 B2
(45) Date of Patent: Mar. 31, 2015

(54) METHOD OF BOOTING A MOTHERBOARD IN A SERVER UPON A SUCCESSFUL POWER SUPPLY TO A HARD DISK DRIVER BACKPLANE

(71) Applicants: Inventec (Pudong) Technology Corporation, Shanghai (CN); Inventec Corporation, Taipei (TW)

(72) Inventor: Yan-Long Sun, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 279 days.

(21) Appl. No.: 13/778,092

(22) Filed: Feb. 26, 2013

(65) Prior Publication Data

US 2014/0115312 A1    Apr. 24, 2014

(30) Foreign Application Priority Data

Oct. 24, 2012  (CN) .......................... 2012 1 0410736

(51) Int. Cl.
G06F 1/00     (2006.01)
G06F 15/177   (2006.01)
G06F 9/44     (2006.01)
G06F 1/26     (2006.01)

(52) U.S. Cl.
CPC ................ *G06F 9/4401* (2013.01); *G06F 1/26* (2013.01)
USPC ............................... 713/300; 713/324; 713/2

(58) Field of Classification Search
CPC .................................................... G06F 1/3203
USPC .......................................................... 713/300
See application file for complete search history.

(56) References Cited

U.S. PATENT DOCUMENTS

| | | | | |
|---|---|---|---|---|
| 6,351,375 | B1 * | 2/2002 | Hsieh et al. | 361/679.33 |
| 6,957,288 | B2 * | 10/2005 | Metevier et al. | 710/100 |
| 8,081,441 | B2 * | 12/2011 | Zhang et al. | 361/679.33 |
| 8,218,309 | B2 * | 7/2012 | Tan | 361/679.33 |
| 8,522,064 | B2 * | 8/2013 | Yu et al. | 713/324 |
| 8,737,058 | B2 * | 5/2014 | Xu | 361/679.37 |
| 2004/0003317 | A1 | 1/2004 | Kwatra et al. | |
| 2006/0256534 | A1 | 11/2006 | Garnett | |

FOREIGN PATENT DOCUMENTS

| | | |
|---|---|---|
| TW | 201044154 | 12/2010 |
| TW | 201212014 | 3/2012 |
| TW | 201228157 | 7/2012 |

* cited by examiner

*Primary Examiner* — Suresh Suryawanshi
(74) *Attorney, Agent, or Firm* — CKC & Partners Co., Ltd.

(57) ABSTRACT

The present invention discloses a server and a booting method thereof. The booting method includes the following steps. A motherboard and a hard disk driver backplane coupled to multiple hard disk drivers are provided, and a working voltage is provided for the hard disk driver backplane, wherein a power-up normal signal is generated when the hard disk driver backplane is powered up normally, and the motherboard includes a booting control circuit and a controller. In response to the power-up condition of the hard disk driver backplane, the booting control circuit receives the power-up normal signal and outputs a power-up control signal to the controller. When receiving the power-up control signal, the controller controls the motherboard to be booted or maintained as off by determining the condition of the power-up control signal, for the data exchange between the motherboard and the hard disk driver.

20 Claims, 6 Drawing Sheets

Providing a motherboard, a power supply unit and a hard disk backboard, wherein the power supply unit provides a working voltage for the hard disk backboard, and the motherboard includes a starting control circuit and a controller; the hard disk backboard is coupled to multiple hard disks and includes a power-up control unit, wherein the power-up control unit converts the working voltage into switching voltages to supply power for the hard disk backboard, generates a power-up normal signal after the hard disk backboard is normally powered up, and outputs the power-up normal signal to the starting control circuit ⎱ S510

Responding to the power-up condition of the hard disk backboard, the starting control circuit receives the power-up normal signal and outputs a power-up control signal to the controller, and when receiving the power-up control signal, the controlle r controls the motherboard to be started or maintained as off by determining the condition of the power-up control signal, for the data interexchange between the motherboard and the hard disk ⎱ S520

Fig. 5

METHOD OF BOOTING A MOTHERBOARD IN A SERVER UPON A SUCCESSFUL POWER SUPPLY TO A HARD DISK DRIVER BACKPLANE

RELATED APPLICATIONS

This application claims priority to China Application Serial Number 201210410736.7, filed Oct. 24, 2012, which is herein incorporated by reference.

BACKGROUND OF THE INVENTION

1. Field of Invention

The present invention relates to a server and a booting method thereof.

2. Description of Related Art

Power failure may occur in using a hard disk driver backplane while a motherboard is booted normally. Under such circumstance, it is rather inconvenient for a user in that the failure of the hard disk driver backplane is concealed from the user. Furthermore, in the prior art the power supply condition of the working voltage is not fed back to the motherboard. Thus, it is an issue to overcome the problem of determining whether the hard disk driver backplane is normally powered.

SUMMARY OF THE INVENTION

In view of the above, the present invention provides a server and a booting method thereof, so as to solve the stated problem in the prior art.

The present invention provides a server, including:

a power supply unit;

the hard disk driver backplane coupled to multiple hard disk drivers and including a power-up control unit, wherein the power supply unit is coupled to the hard disk driver backplane to providing a working voltage, and the power-up control unit converts the working voltage into a switching voltage to supply power for the hard disk driver backplane, and generates a power-up normal signal after the hard disk driver backplane is power-supplied normally; and a motherboard coupled to the power supply unit and including a booting control circuit and a controller, wherein the booting control circuit is coupled to the hard disk driver backplane;

wherein in response to the power-up condition of the hard disk driver backplane, the booting control circuit receives the power-up normal signal and outputs a power-up control signal to the controller, and when receiving the power-up control signal, the controller controls the motherboard to be booted or maintained as off by determining the condition of the power-up control signal, for the data exchange between the motherboard and the hard disk driver.

In the server according to an embodiment of the present invention, multiple working units are fixed on the hard disk driver backplane, and the power supply voltages are not all the same for each of the working units.

In the server according to an embodiment of the present invention, the power supply unit provides the working voltage which is converted to multiple switching voltages in the hard disk driver backplane, and sequentially provides the working voltage and the multiple switching voltages to the working units according to time sequence to supply power for the working units.

In the server according to an embodiment of the present invention, first the power supply unit provides a first working voltage and a second working voltage at the same time, and then the first working voltage and the second working voltage are converted in the hard disk driver backplane to sequentially provide a first switching voltage, a second switching voltage and a third switching voltage.

In the server according to an embodiment of the present invention, the first working voltage, the second working voltage, the first switching voltage, the second switching voltage and the third switching voltage are each 12 V, 5 V, 1 V, 3.3 V and 1.8V.

In the server according to an embodiment of the present invention, when the third switching voltage is generated in the power up condition of the hard disk driver backplane, it represents that the power supply is normal during the process that the first working voltage is converted to the third switching voltage, and the power-up control unit determines whether to output the power-up normal signal or not according to the power supply condition of the third switching voltage.

In the server according to an embodiment of the present invention, the power-up normal signal has two signals, a first power-up normal signal and a second power-up normal signal.

In the server according to an embodiment of the present invention, the booting control circuit includes:

an AND gate, having a first input end, a second input end and an output end, wherein the first input end receives the first power-up normal signal, and the second input end receives the second power-up normal signal;

a switch, wherein a control end of the switch is coupled to the output end, a resistor is electrically connected between a first end of the switch and a working voltage end, and a second end of the switch is coupled to a ground voltage end; and a transistor, wherein a base electrode end of the transistor is coupled to the first end of the switch, an emitting electrode end of the transistor is coupled to the ground voltage end, a collector electrode end of the transistor outputs the power-up control signal to the controller, and the controller controls the motherboard to be booted or maintained as off by determining the condition of the power-up control signal.

In another embodiment, in the server the booting control circuit includes:

a first switch, wherein a control end of the first switch receives the first power-up normal signal, and a resistor is electrically connected between a first end of the first switch and a working voltage end;

a second switch, wherein a control end of the second switch receives the second power-up normal signal, a first end of the second switch is coupled to a second end of the first switch, and a second end of the second switch is coupled to a ground voltage end; and a transistor, wherein a base electrode end of the transistor is coupled to the first end of the first switch, an emitting electrode end of the transistor is coupled to the ground voltage end, a collector electrode end of the transistor outputs the power-up control signal to the controller, and the controller controls the motherboard to be booted or maintained as off by determining the condition of the power-up control signal.

In the server, the controller is a complex programmable logic device.

A booting method of a server is also disclosed, including:

providing a motherboard, a power supply unit and a hard disk driver backplane, wherein the power supply unit provides a working voltage for the hard disk driver backplane, and the motherboard includes a booting control circuit and a controller; the hard disk driver backplane is coupled to multiple hard disk drivers and includes a power-up control unit, wherein the power-up control unit converts the working voltage to supply power for the hard disk driver backplane, generates a power-up normal signal after the hard disk driver backplane is normally powered up, and outputs the power-up normal signal to the booting control circuit; and wherein in response to the power-up condition of the hard disk driver backplane, the booting control circuit receives the power-up normal signal and outputs a power-up control signal to the controller, and when receiving the power-up control signal, the controller controls the motherboard to be booted or maintained as off by determining the condition of the power-up control signal, for the data exchange between the motherboard and the hard disk drivers.

In the booting method of the server according to an embodiment of the present invention, multiple working units are fixed on the hard disk driver backplane, and the power supply voltages are not all the same for each of the working units.

In the booting method of the server according to an embodiment of the present invention, the power supply unit provides the working voltage which is converted to multiple switching voltages in the hard disk driver backplane, and sequentially provides the working voltage and the multiple switching voltages to the working units according to time sequence to supply power for the working units.

In the booting method of the server according to an embodiment of the present invention, first the power supply unit provides a first working voltage and a second working voltage at the same time, and then the first working voltage and the second working voltage are converted in the hard disk driver backplane to sequentially provide a first switching voltage, a second switching voltage and a third switching voltage.

In the booting method of the server according to an embodiment of the present invention, the first working voltage, the second working voltage, the first switching voltage, the second switching voltage and the third switching voltage are each 12 V, 5 V, 1 V, 3.3 V and 1.8 V.

In the booting method of the server according to an embodiment of the present invention, when the third switching voltage is generated in the power up condition of the hard disk driver backplane, it represents that the power supply is normal during the process that the first working voltage is converted to the third switching voltage, and the power-up control unit determines whether to output the power-up normal signal or not according to the power supply condition of the third switching voltage.

In the booting method of the server according to an embodiment of the present invention, the power-up normal signal has two signals, a first power-up normal signal and a second power-up normal signal.

In the booting method of the server according to an embodiment of the present invention, the booting control circuit includes:

an AND gate, having a first input end, a second input end and an output end, wherein the first input end receives the first power-up normal signal, and the second input end receives the second power-up normal signal;

a switch, wherein a control end of the switch is coupled to the output end, a resistor is electrically connected between a first end of the switch and a working voltage end, and a second end of the switch is coupled to a ground voltage end: and a transistor, wherein a base electrode end of the transistor is coupled to the first end of the switch, an emitting electrode end of the transistor is coupled to the ground voltage end, a collector electrode end of the transistor outputs the power-up control signal to the controller, and the controller controls the motherboard to be booted or maintained as off by determining the condition of the power-up control signal.

In the booting method of the server, the booting control circuit includes:

a first switch, wherein a control end of the first switch receives the first power-up normal signal, and a resistor is electrically connected between a first end of the first switch and a working voltage end;

a second switch, wherein a control end of the second switch receives the second power-up normal signal, a first end of the second switch is coupled to a second end of the first switch, and a second end of the second switch is coupled to a ground voltage end; and a transistor, wherein a base electrode end of the transistor is coupled to the first end of the first switch, an emitting electrode end of the transistor is coupled to the ground voltage end, a collector electrode end of the transistor outputs the power-up control signal to the controller, and the controller controls the motherboard to be booted or maintained as off by determining the condition of the power-up control signal.

In the booting method of the server according to an embodiment of the present invention, the controller is a complex programmable logic device.

In this view, the embodiments of the present invention enable the motherboard to be booted only when the hard disk driver backplane is power supplied normally.

BRIEF DESCRIPTION OF THE DRAWINGS

The following accompanying figures are one part of the specification of the present invention and illustrate exemplary embodiments of the present invention. The principle of the present invention can be understood from the following description of the specification and the accompanying drawings.

FIG. 5 is a flow chart of a booting method of a server according to an embodiment of the present invention.

DETAILED DESCRIPTION OF THE PREFERRED OF EMBODIMENT

Figure 1:
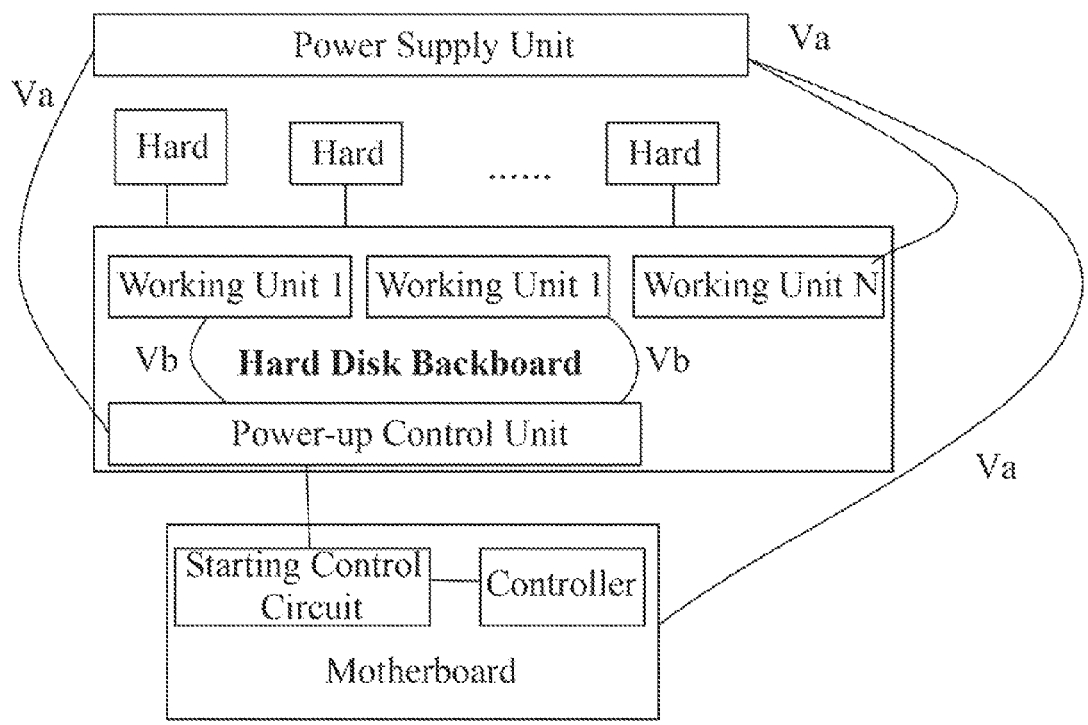
FIG. 1 is a schematic view of a server according to an embodiment of the present invention.

The embodiments of the present invention will be described in details below, and the examples of the embodiments will be illustrated with reference to the accompanying drawings. Moreover, the same reference numbers are used in the drawings and the embodiments to refer to the same or like elements.

It should be understood that, when it is referred to as that an element is "on", "connected to" or "coupled to" another element, it means that the element is directly on another element, connected to another element or coupled to another element, and an intermediate element may exist. On the contrast, when it is referred to as that an element is "directly on", "directly connected to" or "directly coupled to" another element, the intermediate may not exist.

FIG. 1 is a schematic view of a server according to an embodiment of the present invention. As shown in FIG. 1, a server 100 includes a power supply unit 110, a hard disk driver backplane 120, multiple hard disk drivers 122 and a motherboard 140. The hard disk driver backplane 120 is coupled to the multiple hard disk drivers 122, and the hard disk driver backplane 120 includes a power-up control unit 130 and multiple working units. The motherboard 140 includes a booting control circuit 150 and a controller 152. The power-up control unit 130 is coupled to the booting control circuit 150.

Furthermore, the controller 152 may be a complex programmable logic device, and the controller 152 is coupled to the hard disk driver backplane 120 through the booting control circuit 150.

Figure 3:
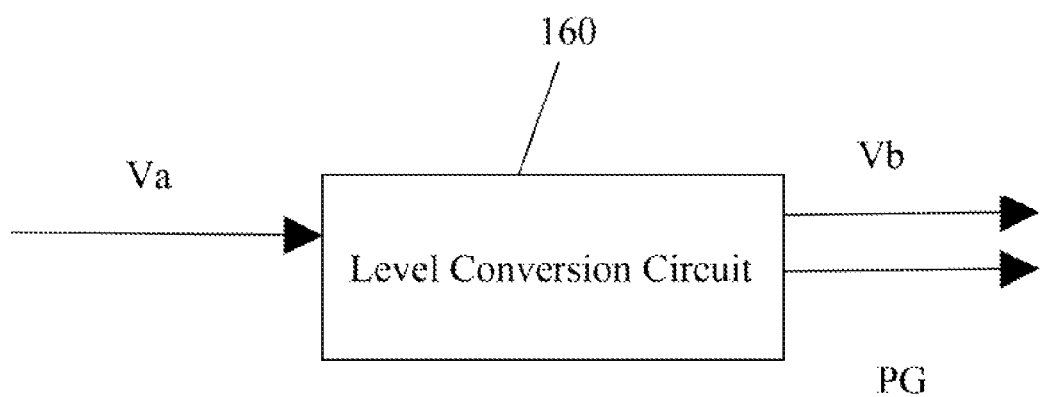
FIG. 3 is a schematic view illustrating that a working voltage is converted to a switching voltage according to an embodiment of the present invention.

The power supply unit 110 is coupled to the hard disk driver backplane 120 and the motherboard 140. The power supply unit 110 provides a working voltage Va to the hard disk driver backplane 120 and the motherboard 140 according to time sequence, and the working voltage Va provided to the hard disk driver backplane 120 is converted to at least one switching voltage Vb by the power-up control unit 130. Referring to FIG. 3, the power-up control unit 130 converts the working voltage Va into the switching voltage Vb through a level conversion circuit 160 (this level conversion circuit 160 is any one of the DC-DC, DC-AC, AC-DC and AC-AC conversion circuits). Multiple working units are fixed on the hard disk driver backplane 120, and the power supply voltages are not all the same for each of these working units, so that supplying power for these working units through the working voltage Va and the switching to voltage Vb cannot certainly enable all the working units of the hard disk driver backplane to be power supplied normally. When the switching voltage Vb and the working voltage Va completely enable all the working units to be power supplied normally, the power-up control unit 130 generates a power-up normal signal PG. Moreover, a power supply sequence in timing exists for the working voltage Va and the switching voltage Vb. In an embodiment, first the power supply unit 110 provides a first working voltage Va1 and a second working voltage Va2 at the same time, and then the first working voltage Va1 and the second working voltage Va2 are converted in the hard disk driver backplane 120 to sequentially provide a first switching voltage Vb1, a second switching voltage Vb2 and a third switching voltage Vb3. When the third switching voltage Vb3 is generated in the power up condition of the hard disk driver backplane 120, it represents that the power supply is normal during the process that the first working voltage Va1 is converted to the third switching voltage Vb3, and the power-up control unit 130 determines whether to output the power-up normal signal PG or not according to the power supply condition of the third switching voltage Vb3. The power-up normal signal has two signals, a first power-up normal signal PGA and a second power-up normal signal PGB.

In response to the power-up condition of the hard disk driver backplane 120, the booting control circuit 150 receives the power-up normal signal PG and outputs a power-up control signal PWG to the controller 152. When receiving the power-up control signal PWG, the controller 152 controls the motherboard to be booted when it is determined that the power-up control signal PWG is at a logic high level, or controls the motherboard to be maintained as off when it is determined that the power-up control signal PWG is at a logic low level, for the data exchange between the motherboard and the hard disk drivers.

It should be noted that, as clearly known from the description of above-mentioned embodiment, a user can determine whether the hard disk driver backplane 120 is working normally or not by checking whether the motherboard 140 is booted normally, which is very convenient for the user.

In an embodiment, the first working voltage Va1, the second working voltage Va2, the first switching voltage Vb1, the second switching voltage Vb2 and the third switching voltage Vb3 are each 12 V, 5 V, 1 V, 3.3 V and 1.8 V. That is, the hard disk driver backplane 120 uses the above-mentioned five normal power supply voltages, wherein 12 V and 5 V are the normal power supply voltages of the hard disk drivers, 3.3 V is the normal power supply voltage of the firmware integrated circuit on the hard disk driver, and 1.8 V and 1 V are the normal power supply voltages of the expander integrated circuit on the hard disk driver backplane 120.

Figure 2:
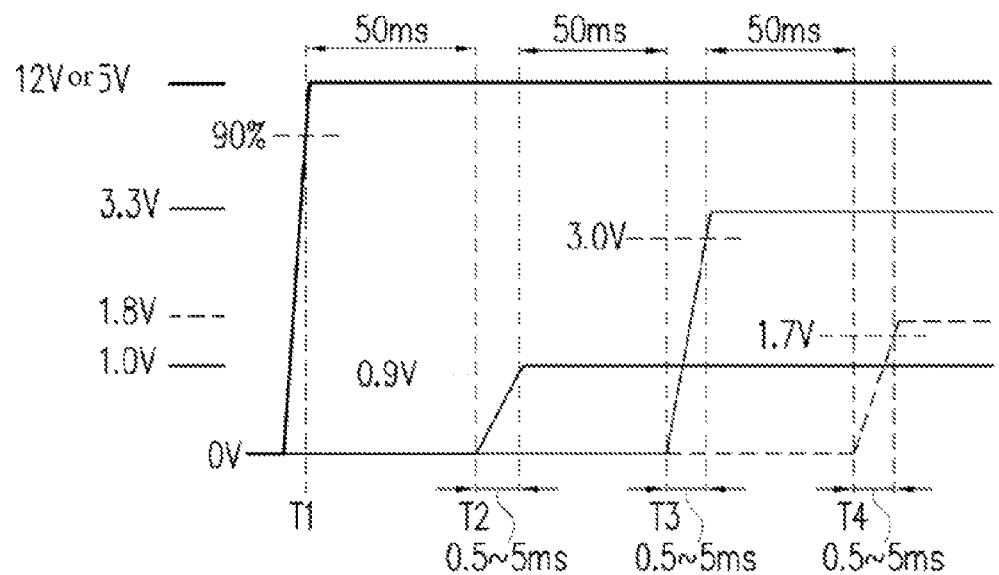
FIG. 2 is a schematic view of the working voltages according to an embodiment of the present invention when the hard disk driver backplane is powered up according to time sequence.

FIG. 2 is a schematic view of the working voltages according to an embodiment of the present invention when the hard disk driver backplane is powered up according to time sequence. As shown in FIG. 2, the timing of the working voltages for power up is: first at a time point T1 12 V and 5 V are provided at the same time, then at a time point T2 1 V is provided, subsequently at a time point T3 3.3 V is provided, and finally at a time point T4 1.8 V is provided. Furthermore, each of the voltages should be maintained for 50 ms at a stable condition thereof, and then another voltage can be subsequently provided. For each voltage, the time period from the start time point of supplying to the time point of reaching the stable condition thereof should be controlled within 0.5 ms to 5 ms.

Referring to FIG. 1 again, since the power supply is controlled in timing, the normal power up sequence is the first working voltage Va1/the second working voltage Va2 (e.g., 12 V/5 V), and then sequentially the first, second and third switching voltages Vb1-Vb3 (e.g., 1 V, 3.3 V, 1.8 V). If the first switching voltage Vb1 (e.g., 1 V) is not detected, the second and third switching voltages Vb2 and Vb3 (e.g., 3.3 V and 1.8 V) behind the first switching voltage Vb1 will also not be detected. As such, for the design of the power-up control unit 130, it can be designed as determining whether the hard disk driver backplane 120 is powered up normally or not by detecting the power up condition of the third switching voltage Vb3 (e.g., 1.8 V). Furthermore, the third switching voltage Vb3 (e.g., 1.8 V) which is finally powered up may be configured in two routes for an actual circuit. Therefore, the power-up control unit 130 can be configured as sending a first and second power-up normal signals PGA and PGB to the booting control circuit 150. For example, when the first and second power-up normal signals PGA and PGB are at logic high level, it means that 1.8 V in the power supply line is normal, although the logic level of the power-up normal signal can also be designed inversely.

Figure 4A:
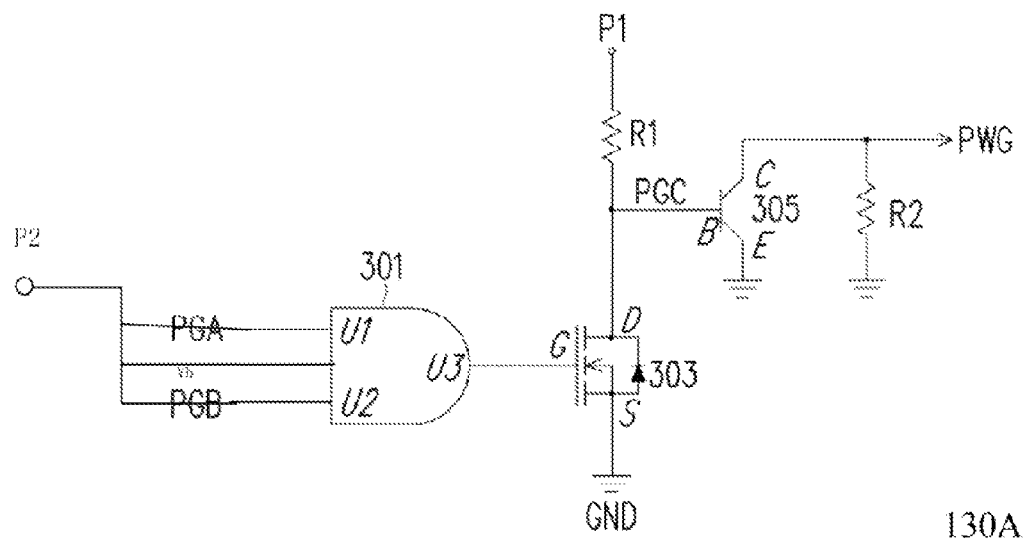
FIGS. 4A and 4B are circuit diagrams of a booting control circuit according to embodiments of the present invention.
Figure 4B:
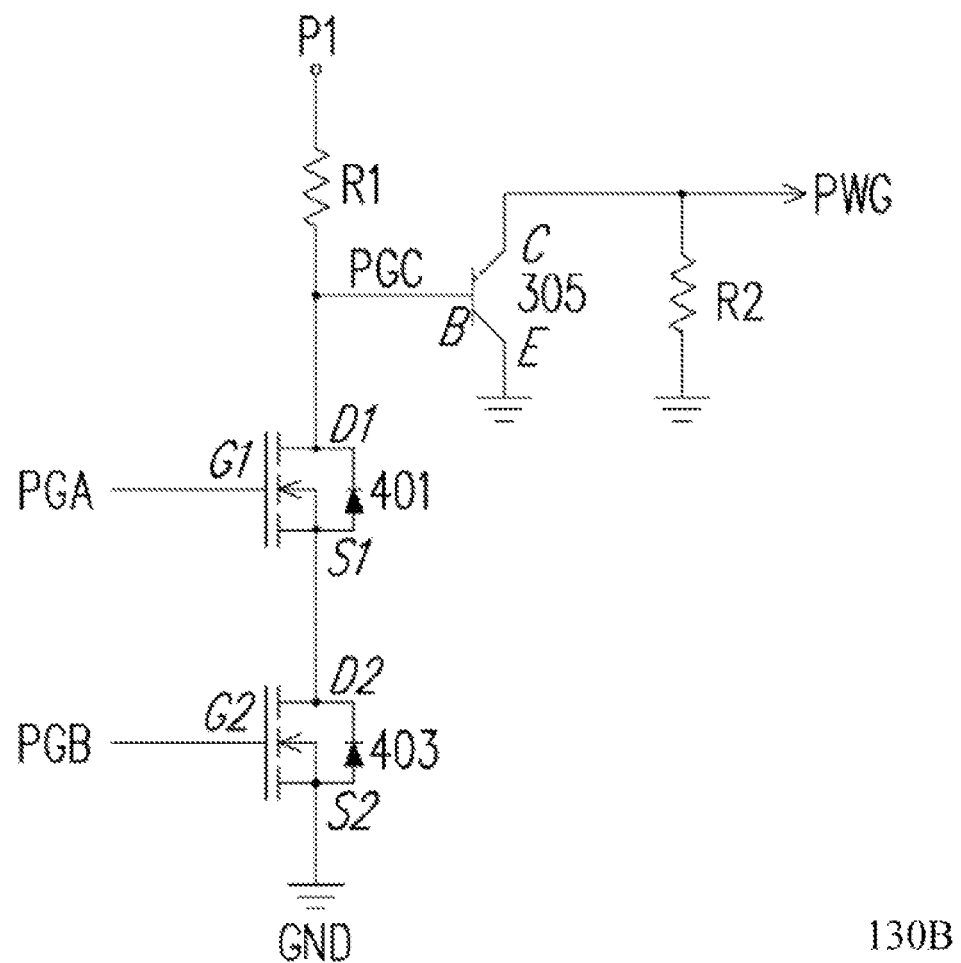

FIGS. 4A and 4B are circuit diagrams of a booting control circuit according to embodiments of the present invention. The constructions of the two booting control circuits are described in details as following.

Referring to both FIGS. 1 and 4A, the booting control circuit 150A includes an AND gate 301, a switch 303, a transistor 305 and resistors R1 and R2. A first input end U1 of the AND gate 301 receives the first power-up normal signal PGA, and the second input end U2 of the AND gate 301 receives the second power-up normal signal PGB. The control end G of the switch 303 is coupled to the output end U3 of the AND gate 301. The resistor R1 is electrically connected between a first end D of the switch 303 and a working voltage end P1. A second end S of the switch 303 is coupled to a ground voltage end GND. A base electrode end B of the transistor 305 is coupled to the first end D of the switch 303. An emitting electrode end E of the transistor 305 is coupled to the ground voltage end GND. A collector electrode end C of the transistor 305 can output the power-up control signal PWG to the controller 152, so that the controller 152 controls the motherboard 140 to be booted or maintained as off by determining the condition of the power-up control signal PWG.

In an alternative embodiment, referring to both FIGS. 1 and 3B, the booting control circuit 150B includes a first switch 401, a second switch 403, a transistor 305 and resistors R1 and R2. A control end G1 of the first switch 401 receives the first power-up normal signal PGA, and the resistor R1 is electrically connected between a first end D1 of the first switch 401 and the working voltage end P1. A control end G2 of the second switch 403 receives the second power-up normal signal PGB. A first end D2 of the second switch 403 is coupled to a second end S1 of the first switch 401. A second end 52 of the second switch 403 is coupled to the ground voltage end GND. The base electrode end B of the transistor 305 is coupled to the first end D1 of the first switch 401. The emitting electrode end E of the transistor 305 is coupled to the ground voltage end GND. The collector electrode end C of the transistor 305 can output the power-up control signal PWG to the controller 152, so that the controller 152 controls the motherboard 140 to be booted or maintained as off by determining the condition of the power-up control signal PWG.

It should be noted that, compared with the booting control circuit 150A, for the elements of the booting control circuit 150B, the AND gate 301 is replaced by a switch element. The logic function of the first switch 401 and the second switch 403 act as a NAND gate, which is a function the same as that of the AND gate 301 and the switch 303. However, the cost of a switch element is much lower than that of the AND gate 301, so that the embodiment of FIG. 3 can reduce the cost greatly.

Furthermore, the logic operating relation between the first switch 401 and the second switch 403 is shown in Table 1 below.

TABLE 1

| PGA | PGB | PGC |
|-----|-----|-----|
| L | L | H |
| H | L | H |
| L | H | H |
| H | H | L | wherein, H and L respectively represent logic high level and logic low level.

As shown in FIGS. 4A and 4B, a section from PGC to PWG is a signal level processing period for Level shift. That is, the level of the PGC is opposite to the level of the PWG, which prevents motherboard intrusion.

Based on the content disclosed in the embodiments above, a common booting method for a server is found. More particularly, FIG. 5 illustrates a flow chart of a booting method according to an embodiment of the present invention. Referring to both FIGS. 1 and 5, the booting method of the embodiment includes the following steps.

As shown in step S510, a motherboard 140, a power supply unit 110 and a hard disk driver backplane 120 are provided, wherein the power supply unit 110 provides a working voltage Va for the hard disk driver backplane 120, and the motherboard 140 includes a booting control circuit 150 and a controller 152; the hard disk driver backplane 120 is coupled to multiple hard disk drivers 122 and includes a power-up control unit 130, wherein the power-up control unit 130 converts the working voltage Va into switching voltages Vb to supply power for the hard disk driver backplane 120, generates a power-up normal signal PG after the hard disk driver backplane 120 is normally powered up, and outputs the power-up normal signal PG to the booting control circuit 150.

The working voltage Va provided to the hard disk driver backplane 120 is converted to at least one switching voltage Vb by the power-up control unit 130. The power-up control unit 130 converts the working voltage Va into the switching voltage Vb through a level conversion circuit 160. Multiple working units are fixed on the hard disk driver backplane 120, and the power supply voltages are not all the same for each of these working units, so that supplying power for these working units through the working voltage Va and the switching voltage Vb cannot certainly enable all the working units of the hard disk driver backplane to be power supplied normally. When the switching voltage Vb and the working voltage Va completely enable all the working units to be power supplied normally, the power-up control unit 130 generates a power-up normal signal PG. Moreover, a power supply sequence in timing exists for the working voltage Va and the switching voltage Vb.

In an embodiment, first the power supply unit 110 provides a first working voltage Va1 and a second working voltage Va2 at the same time, and then the to first working voltage Va1 and the second working voltage Va2 are converted in the hard disk driver backplane 120 to sequentially provide a first switching voltage Vb1, a second switching voltage Vb2 and a third switching voltage Vb3. When the third switching voltage Vb3 is generated in the power up condition of the hard disk driver backplane 120, it represents that the power supply is normal during the process that the first working voltage Va1 is converted to the third switching voltage Vb3, and the power-up control unit 130 determines whether to output the power-up normal signal PG or not according to the power supply condition of the third switching voltage Vb3. The power-up normal signal has two signals, a first power-up normal signal PGA and a second power-up normal signal PGB.

Subsequently, as shown in step S520, in response to the power-up condition of the hard disk driver backplane 120, the booting control circuit 150 receives the power-up normal signal PG and outputs a power-up control signal PWG to the controller 152, and when receiving the power-up control signal PWG, the controller 152 controls the motherboard 140 to be booted or maintained as off by determining the condition of the power-up control signal PWG, for the data exchange between the motherboard 140 and the hard disk driver 122.

Figure 6:
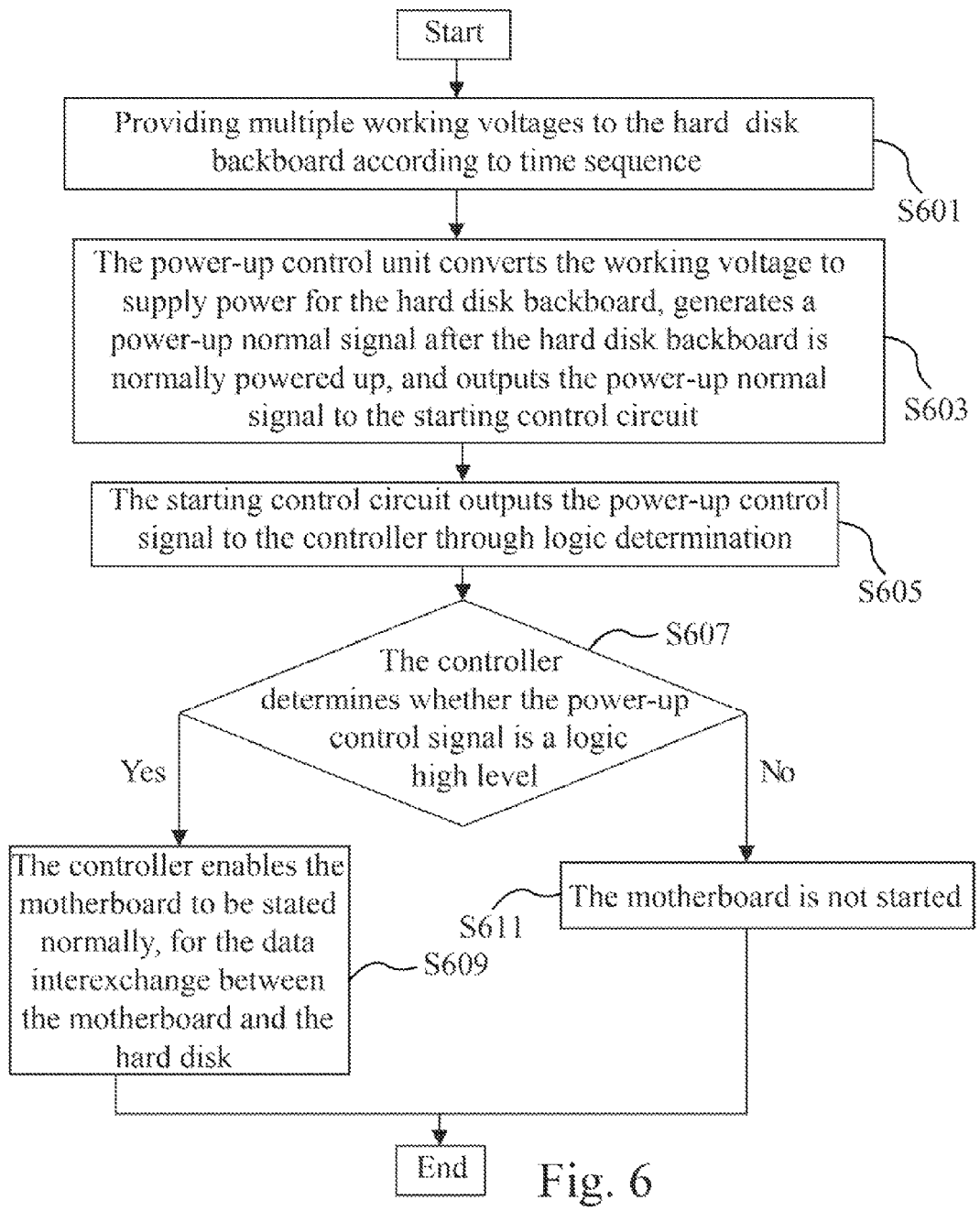
FIG. 6 is a flow chart of a booting method of a server according to another embodiment of the present invention.

Another example is taken for illustration. FIG. 6 is a flow chart of a booting method according to another embodiment of the present invention. Referring to both FIGS. 1 and 6, in step S601 multiple working voltages Va are provided to the hard disk driver backplane 120 according to time sequence.

Subsequently, in step S603, the power-up control unit 130 converts the working voltage Va into the switching voltage Vb to supply power for the hard disk driver backplane 120, generates a power-up normal signal PG after the hard disk driver backplane 120 is power supplied normally, and outputs the power-up normal signal PG to the booting control circuit 150.

Thereafter, in step S605, the booting control circuit 150 outputs the power-up control signal PG to the controller 152 after a logic determination.

Next, in step S607, the controller 152 determines whether the power-up normal signal PG is at logic high level. If so, then the step S609 is started, and otherwise the step S611 is started.

If the step S609 is started, it means that the power up is normal, wherein the controller 152 enables the motherboard 140 to be booted normally, for the data exchange between the motherboard 140 and the hard disk driver 122.

If the step S611 is started, it means that the power supply is abnormal, wherein the controller does not enable the motherboard 140 to be booted.

Therefore, a user can determine whether the hard disk driver backplane 120 is working normally or not by checking whether the motherboard 140 is booted normally.

In view of the aforementioned, the server and the booting method thereof in the present invention can be used to determine whether the hard disk driver backplane is working normally or not by checking whether the motherboard is booted normally, which is very convenient for the user.

Although the present invention has been disclosed with reference to the embodiments above, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. A server, comprising:
    a power supply unit;
    a hard disk driver backplane coupled to multiple hard disk driver drivers and comprising a power-up control unit, wherein the power supply unit is coupled to the hard disk driver backplane to provide a working voltage, and the power-up control unit converts the working voltage into a switching voltage to supply power for the hard disk driver backplane, and generates a power-up normal signal after the hard disk driver backplane is power supplied normally; and
    a motherboard coupled to the power supply unit and comprising a booting control circuit and a controller, wherein the booting control circuit is coupled to the hard disk driver backplane;
    wherein in response to the power-up condition of the hard disk driver backplane, the booting control circuit receives the power-up normal signal and outputs a power-up control signal to the controller, and when receiving the power-up control signal, the controller controls the motherboard to be booted or maintained as off by determining the condition of the power-up control signal, for the data exchange between the motherboard and the hard disk driver drivers.

2. The server of claim 1, wherein multiple working units are fixed on the hard disk driver backplane, and the power supply voltages are not all the same for each of the working units.

3. The server of claim 2, wherein the power supply unit provides the working voltage which is converted to multiple switching voltages in the hard disk driver backplane, and sequentially provides the working voltage and the multiple switching voltages to the working units according to time sequence to supply power for the working units.

4. The server of claim 3, wherein first the power supply unit provides a first working voltage and a second working voltage at the same time, and then the first working voltage and the second working voltage are converted in the hard disk driver backplane to sequentially provide a first switching voltage, a second switching voltage and a third switching voltage.

5. The server of claim 4, wherein the first working voltage, the second working voltage, the first switching voltage, the second switching voltage and the third switching voltage are each 12 V, 5 V, 1 V, 3.3 V and 1.8 V.

6. The server of claim 4, wherein when the third switching voltage is generated in the power up condition of the hard disk driver backplane, it represents that the power supply is normal during the process that the first working voltage is converted to the third switching voltage, and the power-up control unit determines whether to output the power-up normal signal or not according to the power supply condition of the third switching voltage.

7. The server of claim 1, wherein the power-up normal signal comprises tow signals, a first power-up normal signal and a second power-up normal signal.

8. The server of claim 7, wherein the booting control circuit comprises:
    an AND gate, having a first input end, a second input end and an output end, wherein the first input end receives the first power-up normal signal, and the second input end receives the second power-up normal signal;
    a switch, wherein a control end of the switch is coupled to the output end, a resistor is electrically connected between a first end of the switch and a working voltage end, and a second end of the switch is coupled to a ground voltage end; and
    a transistor, wherein a base electrode end of the transistor is coupled to the first end of the switch, an emitting electrode end of the transistor is coupled to the ground voltage end, a collector electrode end of the transistor outputs the power-up control signal to the controller, and the controller controls the motherboard to be booted or maintained as off by determining the condition of the power-up control signal.

9. The server of claim 7, wherein the booting control circuit comprises:
    a first switch, wherein a control end of the first switch receives the first power-up normal signal, and a resistor is electrically connected between a first end of the first switch and a working voltage end;
    a second switch, wherein a control end of the second switch receives the second power-up normal signal, a first end of the second switch is coupled to a second end of the first switch, and a second end of the second switch is coupled to a ground voltage end; and
    a transistor, wherein a base electrode end of the transistor is coupled to the first end of the first switch, an emitting electrode end of the transistor is coupled to the ground voltage end, a collector electrode end of the transistor outputs the power-up control signal to the controller, and the controller controls the motherboard to be booted or maintained as off by determining the condition of the power-up control signal.

10. The server of claim 1, wherein the controller is a complex programmable logic device.

11. A booting method of a server, comprising:
    providing a motherboard, a power supply unit and a hard disk driver backplane, wherein the power supply unit provides a working voltage for the hard disk driver backplane, and the motherboard comprises a booting control circuit and a controller; the hard disk driver backplane is coupled to multiple hard disk drivers and comprises a power-up control unit, wherein the power-up control unit converts the working voltage into switching voltages to supply power for the hard disk driver backplane, generates a power-up normal signal after the hard disk driver backplane is normally powered up, and outputs the power-up normal signal to the booting control circuit; and
    wherein in response to the power-up condition of the hard disk driver backplane, the booting control circuit receives the power-up normal signal and outputs a power-up control signal to the controller, and when receiving the power-up control signal, the controller controls the motherboard to be booted or maintained as off by determining the condition of the power-up control signal, for the data exchange between the motherboard and the hard disk driver.

12. The booting method of the server of claim 11, wherein multiple working units are fixed on the hard disk driver backplane, and the power supply voltages are not all the same for each of the working units.

13. The booting method of the server of claim 12, wherein the power supply unit provides the working voltage which is converted to multiple switching voltages in the hard disk driver backplane, and sequentially provides the working voltage and the multiple switching voltages to the working units according to time sequence to supply power for the working units.

14. The booting method of the server of claim 13, wherein first the power supply unit provides a first working voltage and a second working voltage at the same time, and then the first working voltage and the second working voltage are converted in the hard disk driver backplane to sequentially provide a first switching voltage, a second switching voltage and a third switching voltage.

15. The booting method of the server of claim 14, wherein the first working voltage, the second working voltage, the first switching voltage, the second switching voltage and the third switching voltage are each 12 V, 5 V, 1 V, 3.3 V and 1.8 V.

16. The booting method of the server of claim 14, wherein, when the third switching voltage is generated in the power up condition of the hard disk driver backplane, it represents that the power supply is normal during the process that the first working voltage is converted to the third switching voltage, and the power-up control unit determines whether to output the power-up normal signal or not according to the power supply condition of the third switching voltage.

17. The booting method of the server of claim 11, wherein the power-up normal signal comprises tow signals, a first power-up normal signal and a second power-up normal signal.

18. The booting method of the server of claim 17, wherein the booting control circuit comprises:
an AND gate, having a first input end, a second input end and an output end, wherein the first input end receives the first power-up normal signal, and the second input end receives the second power-up normal signal;
a switch, wherein a control end of the switch is coupled to the output end, a resistor is electrically connected between a first end of the switch and a working voltage end, and a second end of the switch is coupled to a ground voltage end; and
a transistor, wherein a base electrode end of the transistor is coupled to the first end of the switch, an emitting electrode end of the transistor is coupled to the ground voltage end, a collector electrode end of the transistor outputs the power-up control signal to the controller, and the controller controls the motherboard to be booted or maintained as off by determining the condition of the power-up control signal.

19. The booting method of the server of claim 17, wherein the booting control circuit comprises:
a first switch, wherein a control end of the first switch receives the first power-up normal signal, and a resistor is electrically connected between a first end of the first switch and a working voltage end;
a second switch, wherein a control end of the second switch receives the second power-up normal signal, a first end of the second switch is coupled to a second end of the first switch, and a second end of the second switch is coupled to a ground voltage end; and
a transistor, wherein a base electrode end of the transistor is coupled to the first end of the first switch, an emitting electrode end of the transistor is coupled to the ground voltage end, a collector electrode end of the transistor outputs the power-up control signal to the controller, and the controller controls the motherboard to be booted or maintained as off by determining the condition of the power-up control signal.

20. The booting method of the server of claim 11, wherein the controller is a complex programmable logic device.

* * * * *